(12) United States Patent
Brown

(10) Patent No.: US 7,102,343 B1
(45) Date of Patent: Sep. 5, 2006

(54) METHODS AND SYSTEMS HAVING MULTIPLE COOPERATING TRANSFORMERS

(75) Inventor: David R. Brown, Webster, TX (US)

(73) Assignee: Invensys Systems, Inc., Foxboro, MA (US)

(*) Notice: Subject to any disclaimer, the term of this patent is extended or adjusted under 35 U.S.C. 154(b) by 257 days.

(21) Appl. No.: 10/815,025

(22) Filed: Mar. 31, 2004

Related U.S. Application Data

(60) Provisional application No. 60/459,118, filed on Mar. 31, 2003.

(51) Int. Cl.
*H01F 30/12* (2006.01)
*H02M 5/16* (2006.01)
*H02M 1/12* (2006.01)

(52) U.S. Cl. ............................ 323/361; 363/171

(58) Field of Classification Search ............. 323/355, 323/359, 361; 363/8–10, 152–156, 159, 363/164, 165, 170, 171
See application file for complete search history.

(56) References Cited

U.S. PATENT DOCUMENTS

| | | | | |
|---|---|---|---|---|
| 5,138,544 A | * | 8/1992 | Jessee | 363/43 |
| 5,495,403 A | * | 2/1996 | Dhyanchand et al. | 363/43 |
| 5,835,364 A | * | 11/1998 | DeWinter et al. | 363/45 |
| 5,905,367 A | * | 5/1999 | Hochgraf | 323/210 |
| 6,566,895 B1 | * | 5/2003 | Estrela et al. | 324/726 |
| 2003/0078742 A1 | * | 4/2003 | VanderZee et al. | 702/60 |

* cited by examiner

*Primary Examiner*—Matthew V. Nguyen
(74) *Attorney, Agent, or Firm*—Foley Hoag LLP

(57) ABSTRACT

Disclosed are methods, systems, and devices that include a power source having a first voltage having a first frequency, a power-consuming load(s), and a first transformer set comprising a delta-delta transformer and a first voltage controller coupled in series thereto, an input coupled to the power source, producing as output a second voltage having a second frequency and coupled to the power-consuming load(s). Also, a second transformer set has a wye-delta transformer, and a second voltage controller coupled in series thereto, an input is coupled to the power source, producing a phase-shifted third voltage output at a third frequency that is coupled to the power-consuming load(s). The first and second transformer sets are coupled in a parallel configuration such that the second and third voltage signals combine to produce a fourth voltage signal having a fourth frequency.

6 Claims, 9 Drawing Sheets

METHODS AND SYSTEMS HAVING MULTIPLE COOPERATING TRANSFORMERS

CROSS REFERENCE TO RELATED APPLICATIONS

This Application is related to and claims the benefit of Provisional Application Ser. No. 60/459,118, filed on Mar. 31, 2003, and entitled "Voltage Regulator".

BACKGROUND (1) Field

The disclosed methods and systems relate generally to power systems, and more particularly to multiple transformer configurations.

(2) Description of Relevant Art

A common problem in situations involving power system transformer failure is that there is typically a short time lag between the time the main transformer has ceased operation, and the time the back-up transformer, if one is installed, begins operations and allows the power system to resume regular operation. Such a time lag, even if relatively short, and the resultant power interruption to power-consuming devices connected to the power system via the failed transformer could cause sensitive power devices to shut down, thereby resulting in potentially serious economic damage to consumers affected by the power disruption and the ensuing shut down of economically critical power applications. For instance, electrically powered chemical refineries, paper mills, and other similar operations, could suffer economic harm by a power disruption caused by a failed transformer. Additionally, it often becomes necessary to take a transformer off-line for necessary maintenance work. Under these circumstances, a power disruption to consumers, even if a back-up transformer is ready to assume operation, is often inevitable, and could also result in economic harm.

One possible way to address these types of power disruptions is to connect the power-consuming devices to two or more independent power sources. However, such a solution may not be feasible due to expensive overhead necessitated by the connection of two or more power sources, and the accompanying apparatus (e.g., power lines, transformers, etc.). Moreover, such a solution also entails considerable power waste since more power is available to the power-consuming devices than is generally required. Another solution then is to connect two, or more, transformers to the power source supplying power to the power-consuming devices, so that the two, or more, transformers can operate in tandem and thus provide back-up or redundancy to the power system. Although this solution appears to be satisfactory and simple, tandem operation of two or more transformer has been unsatisfactory due to the tendency of multiple transformers used conjunctively to compete with each other for the power supplied by the power source. Consequently, competing transformers cause the power system to become unstable as the voltage levels at the output of the transformers feeding the power consuming devices fluctuate.

SUMMARY

Disclosed are methods and systems that include a power supply system comprising a power source having a first voltage signal having a first frequency; at least one power-consuming load; a first transformer set comprising a delta-delta transformer, and a first voltage controller electrically coupled in series to the delta-delta transformer, the first transformer set having an input and an output, the input of said first transformer set is electrically coupled to the power source to receive the first voltage signal and produce a second voltage signal having a second frequency, and the output of said first transformer set is coupled to the at least one power-consuming load; and a second transformer set comprising a wye-delta transformer, and a second voltage controller electrically coupled in series to the wye-delta transformer, the second transformer set having an input and an output, the input of the second transformer set is electrically coupled to the power source to receive the first voltage signal, the output of the second transformer set is coupled to the at least one power-consuming load, and the wye-delta transformer causes a phase shift to the first frequency of the first voltage signal such that the second transformer set produces a third voltage signal having a third frequency, the third frequency being out of phase with respect to the second frequency; the second transformer set and the first transformer set are coupled in an electrical parallel configuration such that the second voltage signal and the third voltage signal combine to produce a fourth voltage signal having a fourth frequency at the at least one power-consuming load.

The first transformer set of the power supply system can further comprise a first switch for electrically disconnecting the power source from the at least one power consuming load through the first transformer set, and the second transformer set can further comprise a second switch for electrically disconnecting the power source from the at least one power consuming load through the second transformer set.

The first voltage controller of the first transformer set of the power supply system can cause the second voltage signal to be half-wave rectified, and the second voltage controller of the second transformer set causes said third voltage signal to be half-wave rectified.

Also disclosed are methods and systems that include a power supply system comprising a power source having a first voltage signal having a first frequency; at least one power-consuming load device; a first transformer group comprising a first delta-delta transformer electrically coupled in series to a first voltage controller, and a first wye-delta transformer electrically coupled in series to a second voltage controller, the first delta-delta transformer and the first voltage controller connected in an electrical parallel configuration to the first wye-delta transformer and the second voltage controller, the first transformer group has an input and output, the input of the first transformer group is electrically coupled to the power source and the output of the first transformer group is electrically coupled to the at least one power-consuming load, the first transformer group receives the first voltage signal and produces a second voltage signal having a second frequency; and a second transformer group comprising a second delta-delta transformer electrically coupled in series to a third voltage controller, and a second wye-delta transformer electrically coupled in series to a fourth voltage controller, the second delta-delta transformer and said third voltage controller connected in an electrical parallel configuration to the second wye-delta transformer and the fourth voltage controller, the second transformer group has an input and output, the input of said second transformer group is coupled to the power source and the output of the second transformer group is electrically coupled to the at least one power-consuming load, and the second transformer group produces a third voltage signal having a third frequency based on the first voltage signal, and the second transformer group is further electrically coupled in series to a phase-shifter that causes the third frequency to be phase-shifted with respect to the second frequency; the first transformer group is connected in an electrical parallel configuration to the second transformer group and the phase-shifter such that the second voltage signal and the third voltage signal combine to produce a fourth voltage signal having a fourth frequency.

The first transformer group of the further disclosed power system further comprises a first switch for electrically disconnecting the power source from the at least one power consuming load through the first transformer group, and the second transformer group further comprises a second switch for electrically disconnecting the power source from the at least one power consuming load through the second transformer group.

The first voltage controller and the second voltage controller of the first transformer group of the further disclosed power supply system cause the second voltage signal to be half-wave rectified, and the third voltage controller and the fourth voltage controller of the second transformer group cause the third voltage signal to be half-wave rectified.

Other objects and advantages will become apparent hereinafter in view of the specification and drawings.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes, sizes, and brands of components are also exemplary and unless otherwise specified, can be altered without affecting the disclosed systems or methods. Accordingly, although the methods and systems described herein may represent certain components of the Triconex, Eurotherm, and/or other component manufacturers, such components are merely illustrative and other components that provide similar features or that can be modified to provide similar features, can be used.

The disclosed methods and systems relate to multiple transformer arrangements that can be used with power systems, although the methods and systems may be applied to systems other than power systems. The methods and systems can be employed in one or more embodiments that can include, for example, one or more embodiments that may provide for alternating and/or parallel operation.

Figure 1:
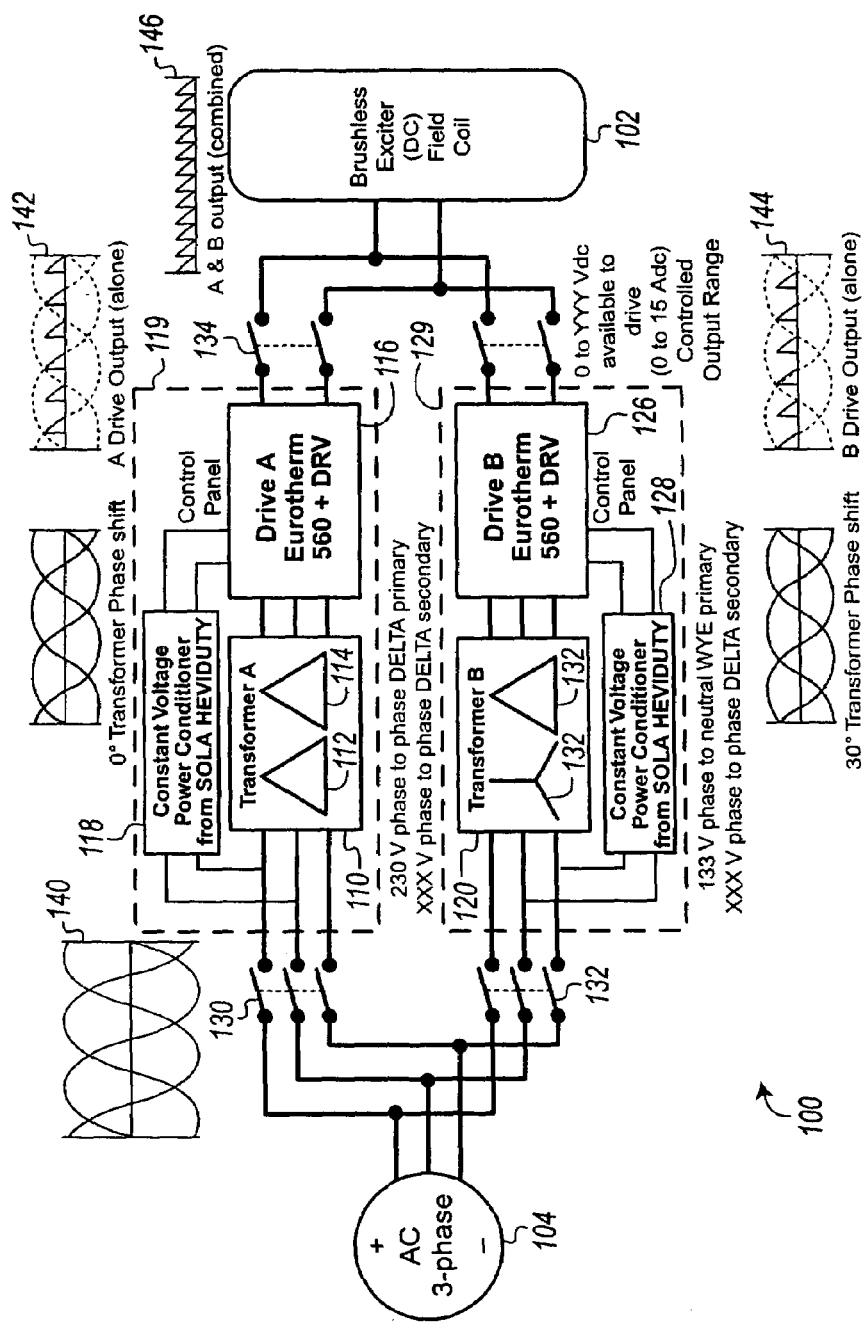
FIG. 1 is a schematic diagram of one embodiment of a power system with multiple redundant cooperating transformers disclosed herein.

FIG. 1 shows an embodiment of a power system 100 for driving an electromechanical device, in this case a brushless exciter 102. Brushless exciter 102 can be one of the many commercially available brushless exciters, such as those manufactured by the Electric Machinery Company or by Toshiba, and may be used to create rotational torque needed to operate an electromechanical device (such as a domestic or industrial machine), or to create a magnetic field in a generator necessary for the generation of electricity. It will be appreciated that the use of a brushless exciter with the system of FIG. 1 is for demonstration purposes, and that other power devices may be used instead of the brushless exciter shown. Moreover, although only one load device is shown connected, a large number of load devices may be connected to power system 100.

As also seen in FIG. 1, input power source 104 is connected to the input of a first transformer 110, labeled as Transformer A, and a second transformer 120, labeled as Transformer B. Although depicted as a 3-phase AC generator, it can be understood that input power source 104 may be the contact point between the transmission lines connecting a general power system to the system 100. As can be seen, first and second transformers 110 and 120 are connected in a parallel configuration, and accordingly both first and second transformers 110 and 120 may individually and independently handle and assume the entire power provided by input source 104 so that in the event that one of first and second transformer 110 and 120 fails, the other transformer can handle the additional power, previously handled by the failed transformer.

As shown, first transformer 110 is a delta-delta transformer that takes as input the 3-phase input voltage provided by input power source 104, and outputs a 3-phase output voltage. The output voltage of a delta-delta transformer depends on the ratio between the number of wire turns on the primary winding 112 (i.e., on the first delta of first transformer 110), and the number of turns on the secondary winding 114 (i.e., on the second delta of first transformer 110). The output of first transformer 110 is coupled to the input of a first voltage controller 116, which may one of many commercially available voltage controllers, or drivers, including, for example, the Eurotherm 590+ DRV DC driver. Among other things, first voltage controller 116 may, if desired, provides controlled DC at the output of the controller by directing the AC voltage presented as input to the controller to a DC rectifying bridge. Voltage controller 116 may also provide Proportional-Integral-Derivative (PID) control capabilities, and other control features that facilitate power control, and/or the elimination of spurious fluctuations and oscillations in the amplitude and frequency of the transformer produced voltage being controlled by the voltage controller to provide the target electromechanical device (in this case brushless exciter 102) a voltage signal. For example, the PID functionality of such a voltage controller could be employed to change the output current of the respective transformer based on a current setpoint. The current setpoint can be based on the output of a PID controller that can measure and/or accept as input the generator voltage and/or otherwise provide an output based on the generator voltage. The first voltage controller 116 may also be implemented using a general purpose CPU-based device, comprising memory elements and peripheral devices having receiving/transmitting functionality, and/or other circuitry needed for the operation of voltage controller 116 and the execution of any software thereon. When implemented as a general purpose CPU-based device, first voltage controller 116 would also require input power ports for receiving the power voltage that is to be controlled, and output power ports for providing the controlled (or regulated) output power voltage to load device 102. As such, these input/output power ports, and an internal module or component that handles the power voltage received from first transformer 110 would have to have a power rating large enough to handle the large power levels delivered by input power source 104. Optionally, to facilitate the operation of first voltage controller 116, a first power conditioner 118 may be connected to power controller 116. As is known in the art, power conditioners can be used to regulate, filter, and suppress noise in AC power. First power conditioner 118 may be one of many commercially available power conditioner, including, for example, the Constant Voltage Power Conditioner manufactured by Sola Hevi-Duty, or may also be implemented as a general purpose CPU-based device having the necessary memory elements, peripheral devices to enable receiving/transmitting functionality, and/or other circuitry for control of power conditioner, as well as input ports for receiving and handling the large input voltage power from input power source 104, and output ports for directing control signals to first voltage controller 116. These control signals enable first voltage controller 116 to adjust its operation to produce the rectified voltage provided to load device 102. For the purposes of the present discussion and for ease of reference, a transformer coupled to a voltage controller and/or power conditioner will be collectively referred to as a transformer set. Accordingly, as shown in FIG. 1, first transformer set 119 comprises delta-delta transformer 110, first voltage controller 116 and first power conditioner 118.

Connected to the input of first transformer 110 and to the output of first voltage controller 116 are switches 130 and 134 respectively. When first transformer set 119 malfunctions or otherwise is taken off-line for regular maintenance work, switches 130 and 134 may be placed into their open position to electrically disconnect first transformer set 119, and thereby allow maintenance personnel to repair, maintain, or replace any or all of the modules making up transformer set 119.

Connected in parallel to first transformer set 119 is second transformer set 129. Like first transformer set 119, second transformer set 129 comprises a second transformer 120 whose input is coupled to input power source 104, and whose output is connected in series to a second voltage controller 126. Second power conditioner 128 is also connected to the input power source 104, and upon processing of the 3-phase input power voltage it receives from input power source 104, second power conditioner 128 sends control signals to second voltage controller 126. Second voltage controller 126 uses the control signals it received from second power conditioner 128 to operate and process the transformed voltage power it receives from the output of second transformer 120. In the embodiment of FIG. 1, second transformer 120, labeled as Transformer B, is a wye-delta transformer. As will be appreciated by the person of ordinary skill, aside from transforming the voltage level of input power source 104 in accordance with the winding ratio of second transformer 120, a wye-delta transformer also causes the output power voltage (i.e., at the delta winding 124 of the second transformer 120) to be shifted by 30° with respect to the input power voltage received from input power source 104. Thus, the second voltage controller 126 can produce a rectified output voltage similar to the rectified voltage power produced by first voltage controller 116, except that the rectified voltage signal produced by second voltage controller 126 can be phase shifted, such as, for example, by 30°. Connected to the input of second transformer 120 and to the output of second voltage controller 126 are switches 132 and 136 respectively. These switches are used to electrically disconnect transformer set 129 when the transformer set malfunctions or otherwise requires some maintenance work.

As shown by FIG. 1, first transformer 110 is a delta-delta transformer, and second transformer 120 is a wye-delta transformer. The use of "first" and "second" is merely for convenience purposes and is arbitrary.

In operation, input power source 104 presents a 3-phase voltage signal (shown in FIG. 1 as signal 140) to the delta-delta transformer 110 and the wye-delta transformer 120. First transformer 110, which has a winding ratio that produces the desired voltage level at the output of the transformer, transforms the voltage level of input power source 104 to a voltage needed for operation of the output device 102. As was noted, a delta-delta transformer does not cause a phase shift in the resultant transformed output voltage signal relative to the input voltage. First voltage controller 116 receives the transformed output voltage produced by first transformer 110 and the control signals generated by first power conditioner 118, and produces a half-rectified voltage signal, such as exemplary first signal 142 shown in FIG. 1. As exemplary first signal 142 shows, the output produced by power controller 116 includes the positive polarity portion of the output of the 3-phase voltage transformed by delta-delta transformer 110, but does not include the negative polarity portion of the transformed voltage signal due to the rectifier circuitry of first voltage controller 116. It will be understood that first voltage controller 116 may provide a fully rectified output signal, or may otherwise process the signal presented as input to it in other ways known in the art. As can be seen from the illustration of first signal 142, showing the rectified shaded signal overlaid on the outlines of the 3-phase output signal produced by delta-delta transformer 110, one cycle of the transformed output signal results in six cycles of the rectified signal 142. Thus, for a 3-phase input power voltage having a frequency of 60 Hz (i.e., 60 cycles per second), the voltage controller 116 would produce a rectified voltage having a frequency of 360 Hz.

Similarly, voltage signal 140 is presented at the input to the wye-delta transformer 120. Second transformer 120, which may have the same winding ratio to produce the same voltage level at the output of the transformer that was produced by the delta-delta transformer 110, transforms the voltage level of input power source 104 to a desired voltage level. As was noted, a wye-delta transformer causes a phase shift of 30° in the resultant transformed output voltage relative to the input voltage. The transformed output voltage produced by second transformer 120 is presented as input to second voltage controller 126, which further uses the output signals generated by second power conditioner 128 to produce a half-rectified voltage signal, such as exemplary second signal 144 shown in FIG. 1. As exemplary second signal 144 shows, the output produced by second voltage controller 126 includes the portion of the 3-phase voltage output of the wye-delta transformer 120 having a positive polarity, but does not include the negative polarity portion due to the rectifier circuitry of second voltage controller 126. Again, it will be understood that second voltage controller 126 may provide a fully rectified output signal, or may otherwise process the voltage signal it receives as input in other ways known in the art. As can be seen from the illustration of second signal 144, showing the half-rectified shaded signal overlaid on the outlines of the 3-phase wye-delta transformer output signal, one cycle of the transformer's 3-phase output signal corresponds to six cycles of the signal produced by second voltage controller 126. As can further be seen by comparing first signal 142 (the signal produced by voltage controller 116) to second signal 144, second voltage signal 144 is shifted by 30° with respect to voltage signal 142, but is otherwise the same. As can further be seen, second voltage signal 144 comprises six voltage cycles for every one cycle of any one phase of the 3-phase AC voltage produced by wye-delta transformer 120. Thus, for a 3-phase input power voltage having a frequency of 60 Hz (i.e., 60 cycles per second), second voltage controller 126 produces a voltage signal having a frequency of 360 Hz.

In the FIG. 1 embodiment, first and second signals 142 and 144 are thus presented to device 102 as two signals having substantially the same amplitude and signal shape, but with one signal shifted by 30° with respect to the other. As first and second signals 142 and 144 are not congruent, the two signals thus combine constructively to form resultant voltage signal 146. As first and second signal 142 and 144 each comprise six cycles for every one cycle of any one of the phases of the input 3-phase AC voltage presented by the power source 104, or by the outputs of transformers 110 and/or 120, signal 146 thus has twelve cycles for every cycle of the original voltage signal provided by input power source 104. Consequently, a 60 Hz 3-phase AC voltage signal presented at the input of the system 100 would result in a single-phase 720 Hz signal (60 cycles×12 peaks/cycle). By driving load device 102 by two 3-phase transformer/voltage controller apparatus that produce non-congruent voltage signals and thus combine constructively, load device 102 effectively receives power from two non-competing independent sources, thereby avoiding power system instability that may have occurred had first and second transformer sets 119 and 129 produced in-phase voltage signals.

When one of first and second transformer sets 119 and 129 malfunctions, and/or no longer provides power to load device 102, the power originally drawn and provide by the malfunctioning transformer set will be diverted and handled by the other transformer set. The other transformer set will thus be able to provide the same total power to load device 102, and all other load devices connected to the transformer sets, that was originally provided by the two transformer sets working in tandem. Testing performed on the embodiment of the system shown in FIG. 1 has shown that in situations where one of the transformer sets malfunctions, power continues to be provided to the load devices without any power interruptions. Although the malfunction of one transformer set may create a momentary power instability as the remaining transformer set attempts to adjust and stabilize its power output, stable power flow to the load devices is achieved within approximately two to five milliseconds. It will also be appreciated that when system 100 has only one transformer set delivering power, the frequency of the voltage signal delivered to the load devices will be approximately half the frequency of the combined signal produced by the tandem operation of first and second transformer sets 119 and 129.

As would further be understood by a person skilled in the art, during operation of system 100, switches 130, 132, 134, and 136 are closed and provide a direct electrical path between the output of voltage controller 116 and 126, respectively, and load device 102. When power to load device 102 (and all other connected load devices) is interrupted due to a malfunction of one of first and second transformer sets 119 and 129, for example, it is necessary to take the malfunctioning transformer set off-line for repair and maintenance purposes to restore system 100 to normal operation. To restore system 100 to its normal operation, the malfunctioning module is first identified, and subsequently the corresponding transformer set is disconnected from load device 102 and power source 104 by switching off the corresponding switches. The remaining transformer set will, as noted, remain connected in a closed electrical path to load device 102 (and all other load devices connected thereto), and accordingly will continue to provide power to the connected load device(s). Once the malfunctioning transformer set has been repaired, it can be reconnected to the load device(s) by closing the corresponding switches, and restoring the parallel power supply configuration of system 100.

Figure 2:
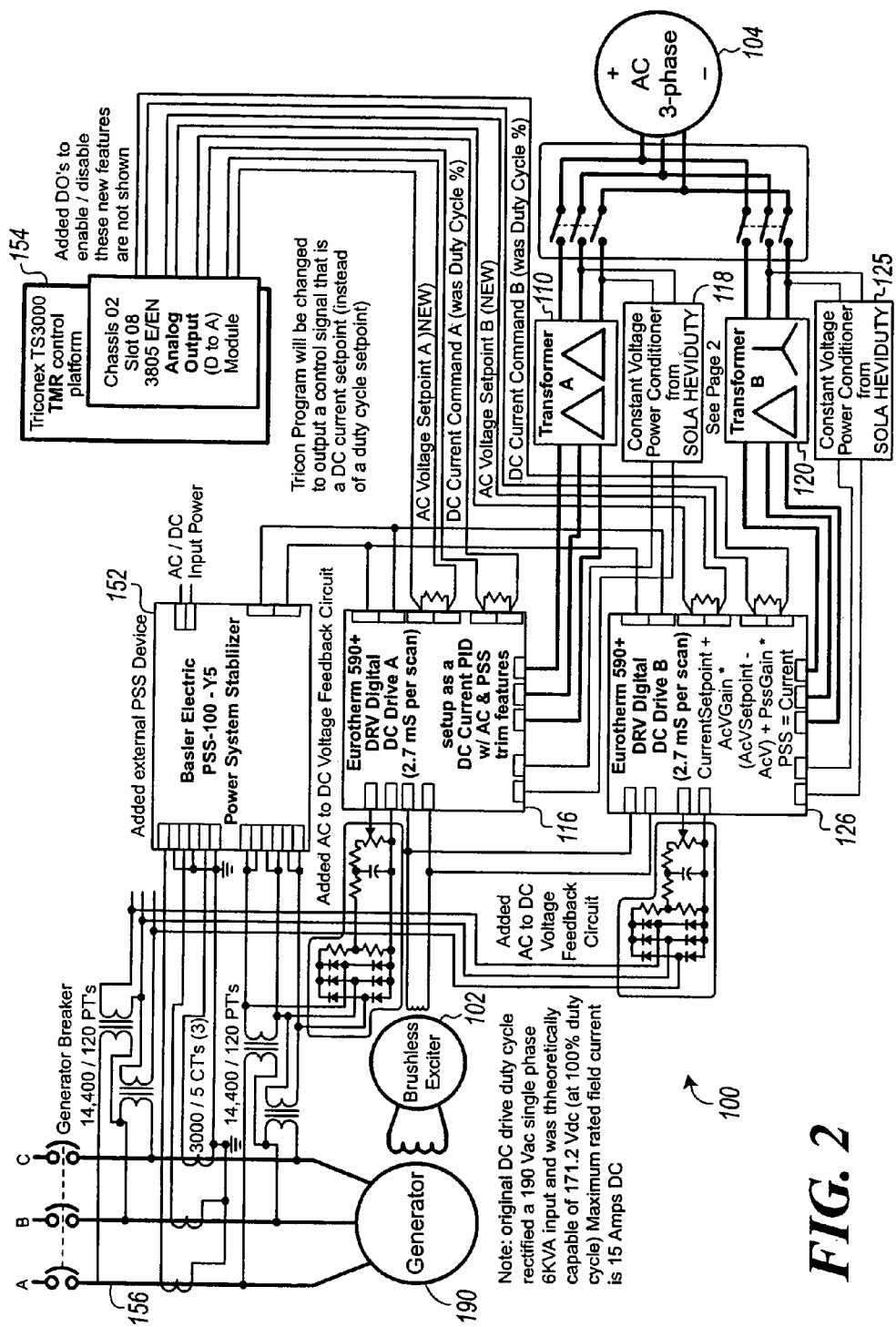
FIG. 2 is a schematic diagram showing a more detailed illustration of the system according to FIG. 1.
Figure 3:
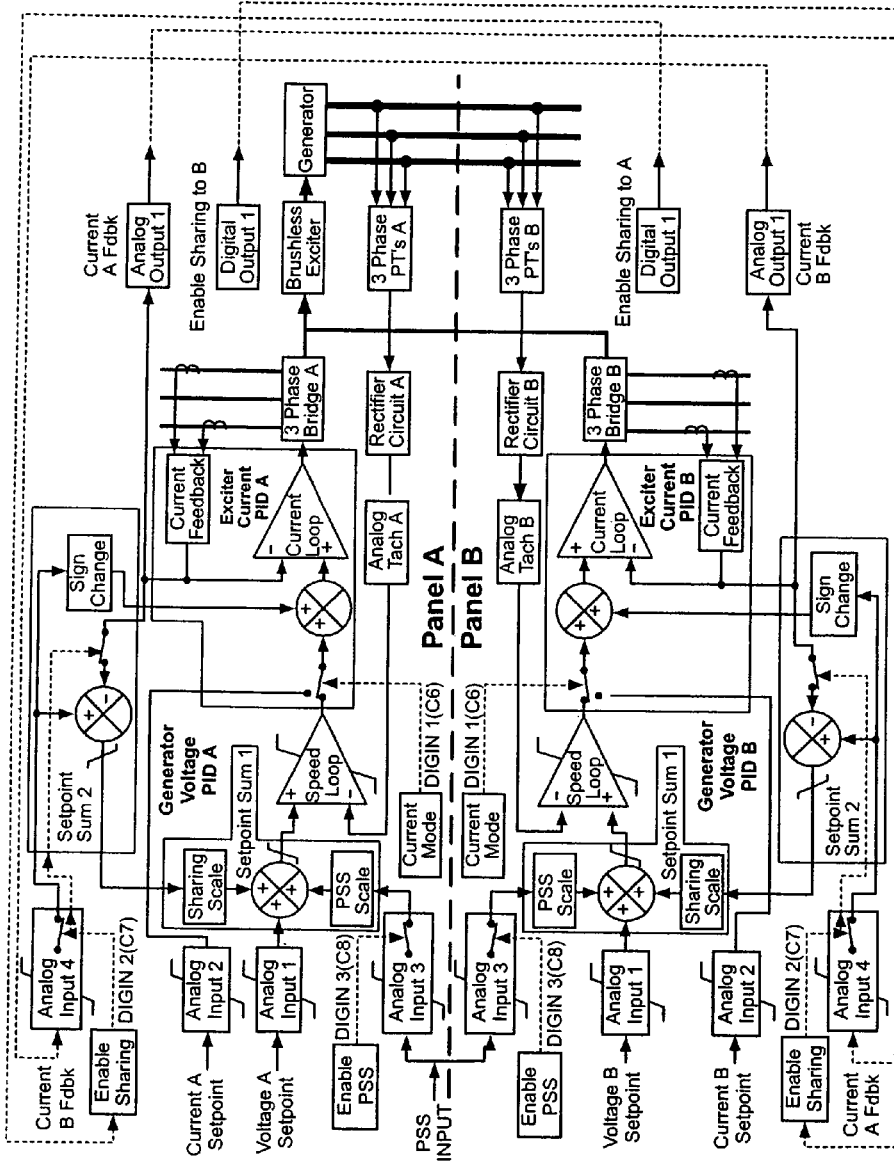
FIGS. 3–7 are schematic diagrams showing further details of the system according to FIGS. 1 and 2.
Figure 4:
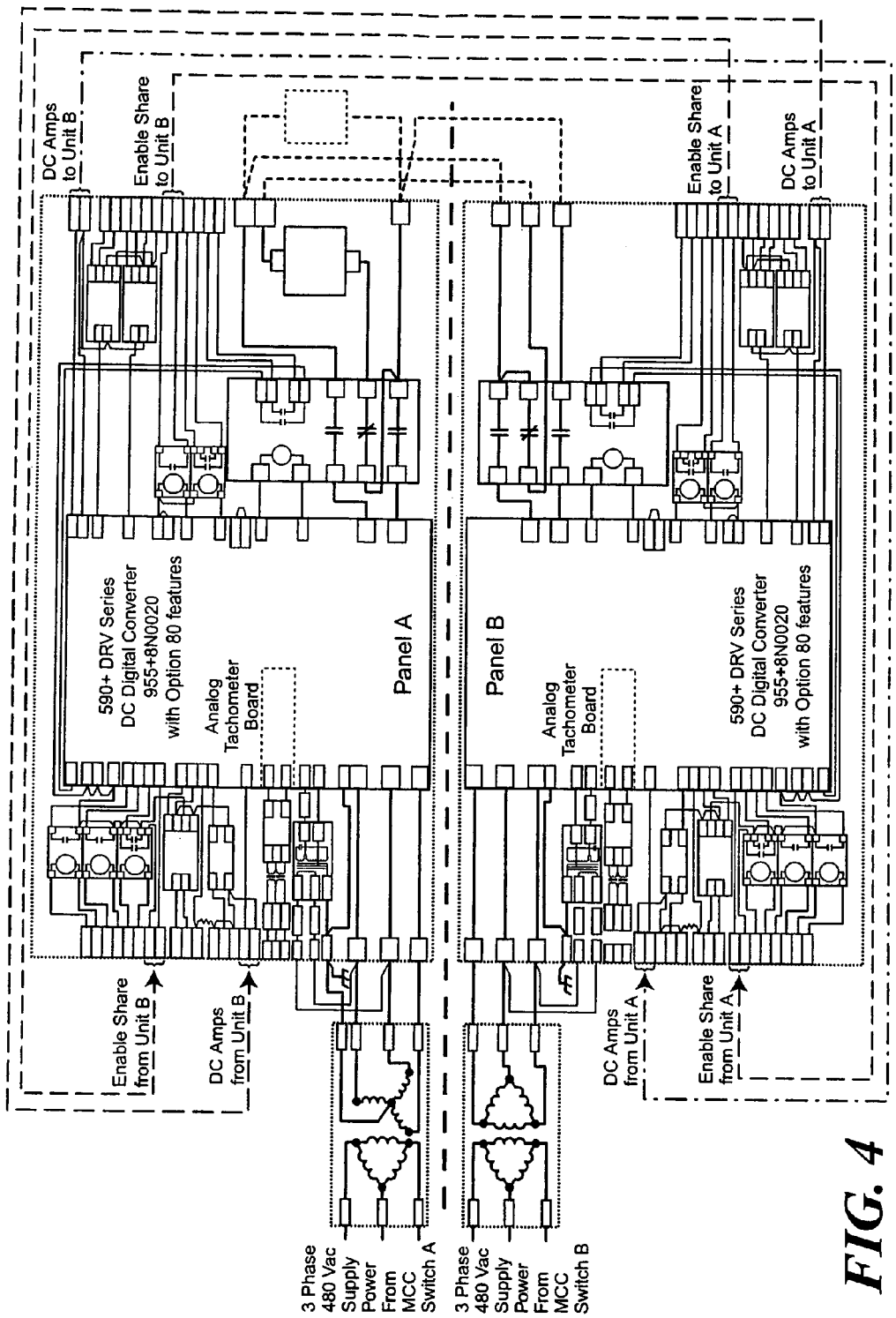
Figure 5:
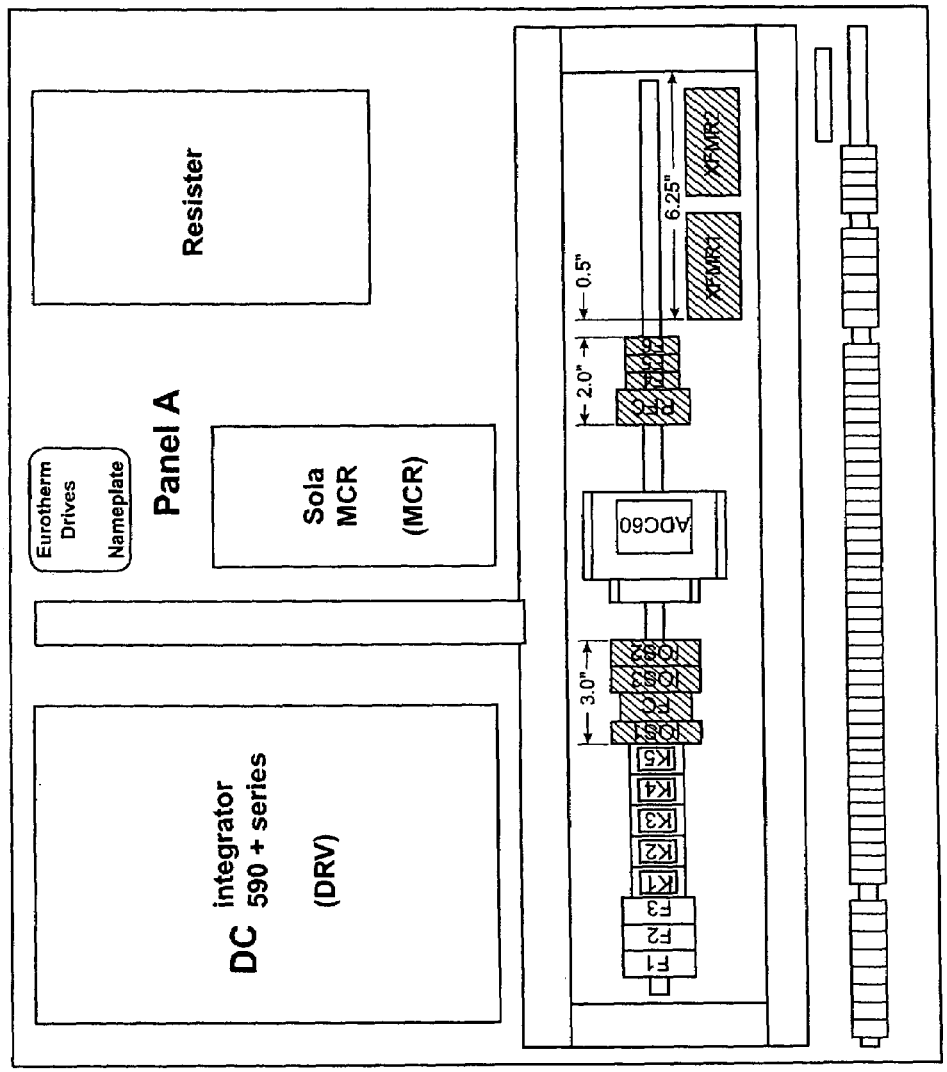
Figure 6:
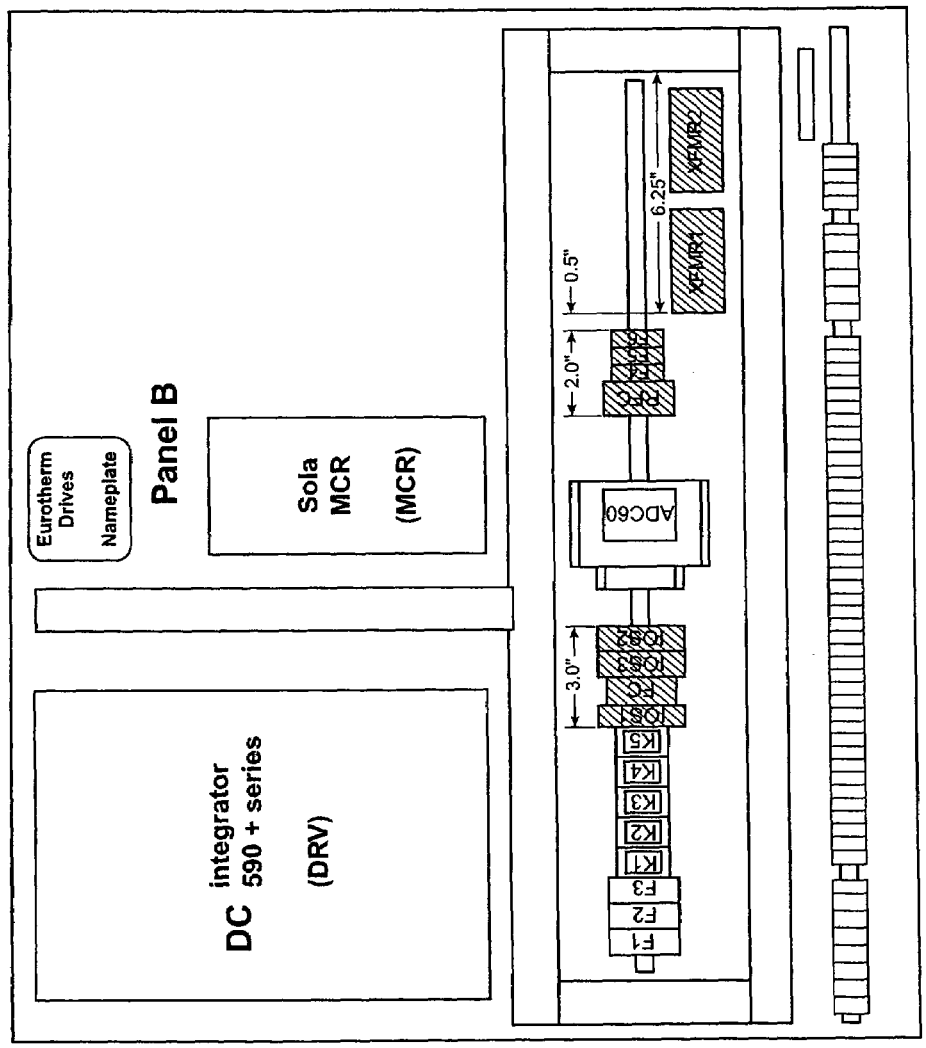
Figure 7:
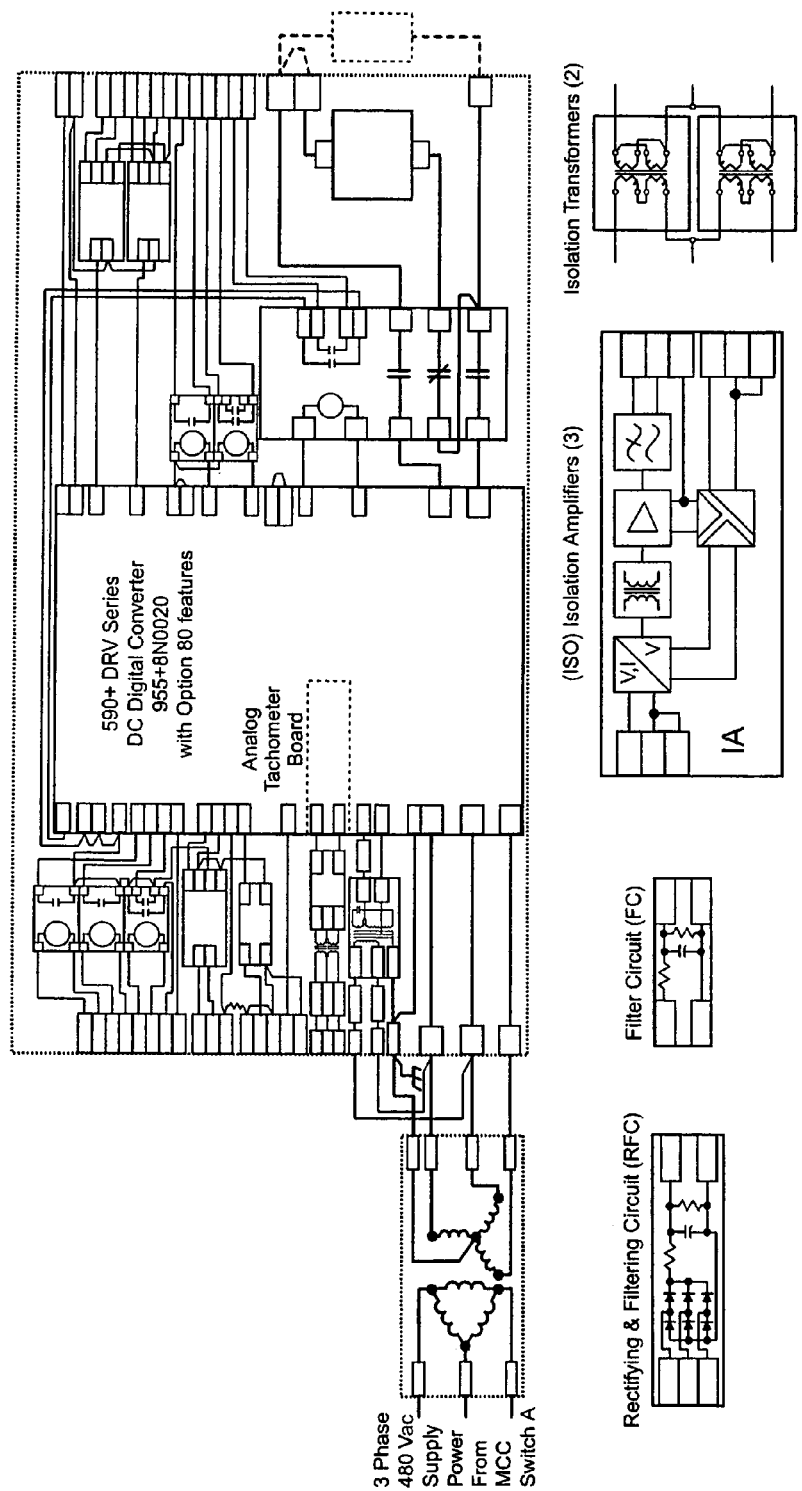

FIG. 2 provides a more detailed illustration of system 100 to power a brushless exciter that in turn creates a magnetic field inside a generator 150. More particularly, as can be seen in FIG. 2, first voltage controller 116 and second voltage controller 126 power brushless exciter 102, which creates a magnetic field inside generator 150 needed to generate power. The voltage signal generated by generator 150 is transmitted to power-consuming loads (not shown) via power lines 156. The voltage signals presented by each of voltage controller 116 and 126 are positive polarity oscillating voltages having a frequency of 360 Hz (see first and second signals 142 and 144, FIG. 1). As previously noted, the resultant signal 146 constituted from the first and second signals 142 and 144 (as shown in FIG. 1) is a positive polarity oscillating signal having a frequency of 720 Hz.

As further shown in FIG. 2, coupled to first and second voltage controllers 116 and 126 is a power system stabilizer (PSS) 152. PSS 152 can be viewed as an additional block of a generator excitation control or Automatic Voltage Regulator (AVR) that can be added to improve the overall power system dynamic performance, especially for the control of electromechanical oscillations. The PSS can thus use auxiliary stabilizing signals such as shaft speed, terminal frequency, and/or power to change the input signal to the AVR. This can enhance small-signal stability performance on a power system network. PSS 152 can thus be understood to extend the angular stability limits of a power system by providing supplemental damping to the oscillation of synchronous machine rotors via the generator excitation. In some systems, this damping is provided by an electric torque that is applied to the rotor(s) and in phase with the speed variation of the rotor(s). The additional control provided by PSSs can thus be advantageous during line outages, power transfers, and other interruptions. In system 100 shown in FIG. 2, PSS 152 probes power lines 156 to detect, among other things, any power fluctuations, and accordingly determines whether any system instability is present in system 100. Based on information PSS extracts from power lines 156, PSS 152 generates output control signals that are sent to voltage controllers 116 and 126, which thereafter make adjustments to the voltage signals produced by them. PSS 152 may be one of the various commercially available PSS, such as Basler Electric PSS-100, or PSS 152 may be implemented as a CPU-based device which can store and execute computer instructions. Optionally, as shown in FIG. 2, another controller 154 for providing additional control to the overall stability of system 100 may be added. Such a controller may also be a commercially available controller, such as the TRICON TS 3000, or may also be implemented as a CPU-based device capable of storing and executing computer instructions.

FIGS. 3–7 show in yet greater detail the specific implementation features of the system 100 shown generally in FIG. 1, and more particularly in FIG. 2, including diagrams and schematics detailing the various ports and connections used in a specific implementation of system 100.

Figure 8:
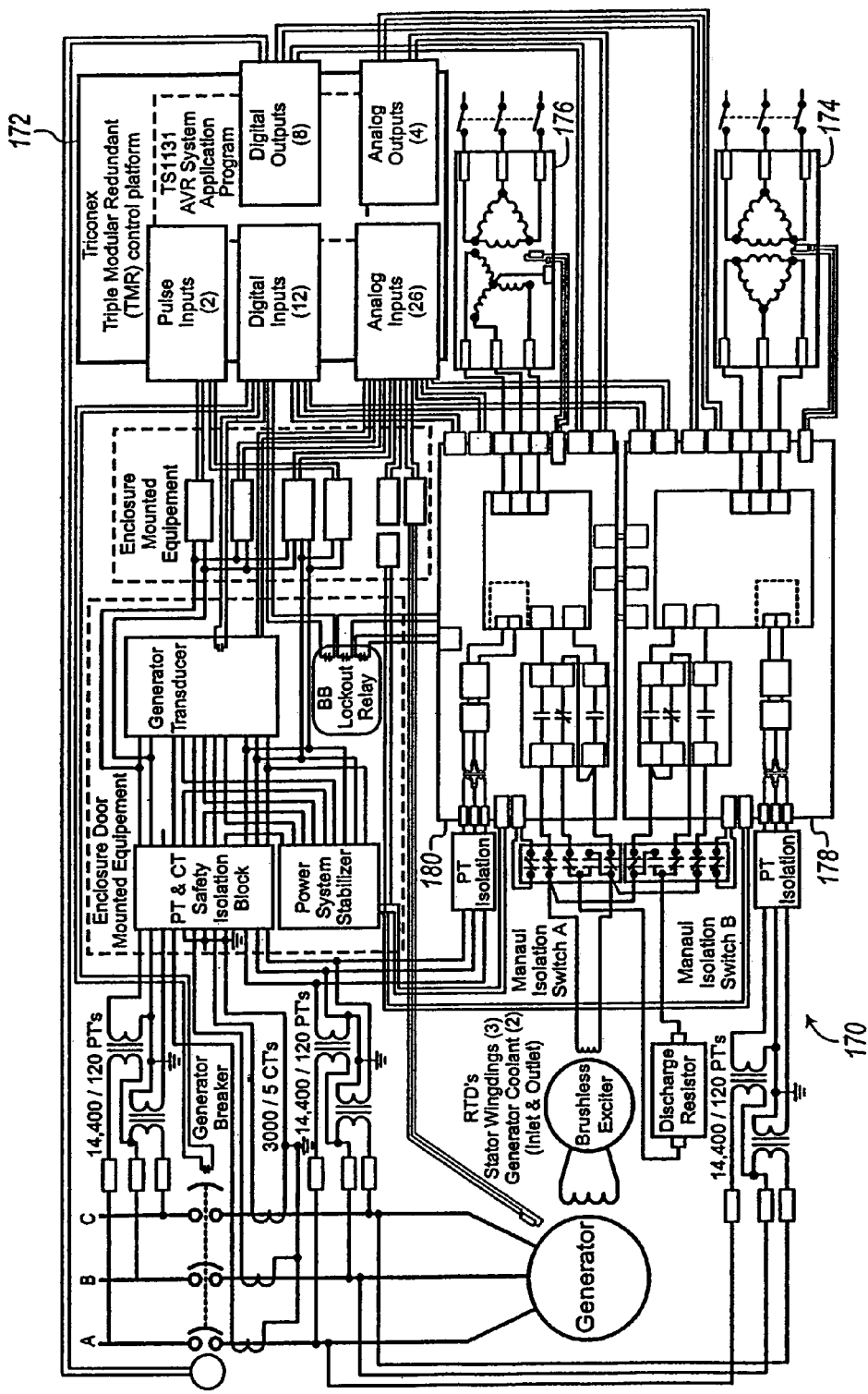
FIG. 8 is a schematic diagram showing an exemplary Excitation Drive system retrofit application using the system according to FIG. 1.

FIG. 8 is a schematic diagram showing an exemplary Excitation Drive system retrofit 170 using a system similar to system 100 shown in FIG. 1. As shown in FIG. 8, the system 170 comprises an Automatic Voltage Regulator (AVR) 172 and a delta-delta transformer 174 coupled to a wye-delta transformer 176 in an electrical parallel configuration. System 170 is implemented in such a way that system 170 is capable of on-line restoration to full system status, without requiring a operating generator system interruption or shutdown. AVR 172 may be any commercially available AVR such as, for example, the Triconex Generator Control system able to provide triple-modular-redundant (TMR) fast acting digital based generator control functionality that includes a fault tolerant redundant set of current sharing exciter drives that may be on-line changeable and maintainable. Such a fault-tolerant feature may allow system 170 to continue to operate and to control the generator system, if or when any included related system component suddenly fails.

Coupled to the delta-delta transformer 174 and wye-delta transformer 176 are first and second digitally controlled three-phase full wave controlled rectifier bridges 178 and 180 respectively. Both first and second bridges 178 and 180 may incorporate generator terminal voltage PID controls, which can be switched on to cascade into high gain exciter field current drive PID control loops. System 170 may also operate with modern off-the shelf industrial Power System Stabilizer (PSS) devices that have an adjustment signal scaled for +/−10 V (DC). Both first and second bridges 178 and 180 utilize a supply (ac) side internal current "input flow" to generate an "output flow" dc current signal for the exciter field current drive. The first and second digitally controlled three-phase full wave controlled rectifier bridges are supplied different (i.e., 30° phase shifted) voltages, which creates a unique control firing trigger pattern region for each one of the twelve total (6 per bridge) combined system set of rectifiers. This carefully created combination of conditions uniquely allows these two drive bridge outputs to easily be combined together into one resulting dc current output, while also allowing each drive bridge to maintain and perform closed loop current control with its own independent PID control contribution. The cascaded generator terminal voltage PID control is utilized as the very fast response system supporting part of the traditional "Automatic Voltage" AVR control mode.

System 170 is configured to accept either 50 or 60 Hz rated system three-phase instrument sensing signals from generator current transformers (CT's) and potential transformers (PT's). A possible arrangement would have three CT's scaled for a maximum of 5 amperes secondary current signals. A possible arrangement would also have two PT's in an open delta configuration scaled for a nominal 120 V (AC) phase to phase signal.

Figure 9:
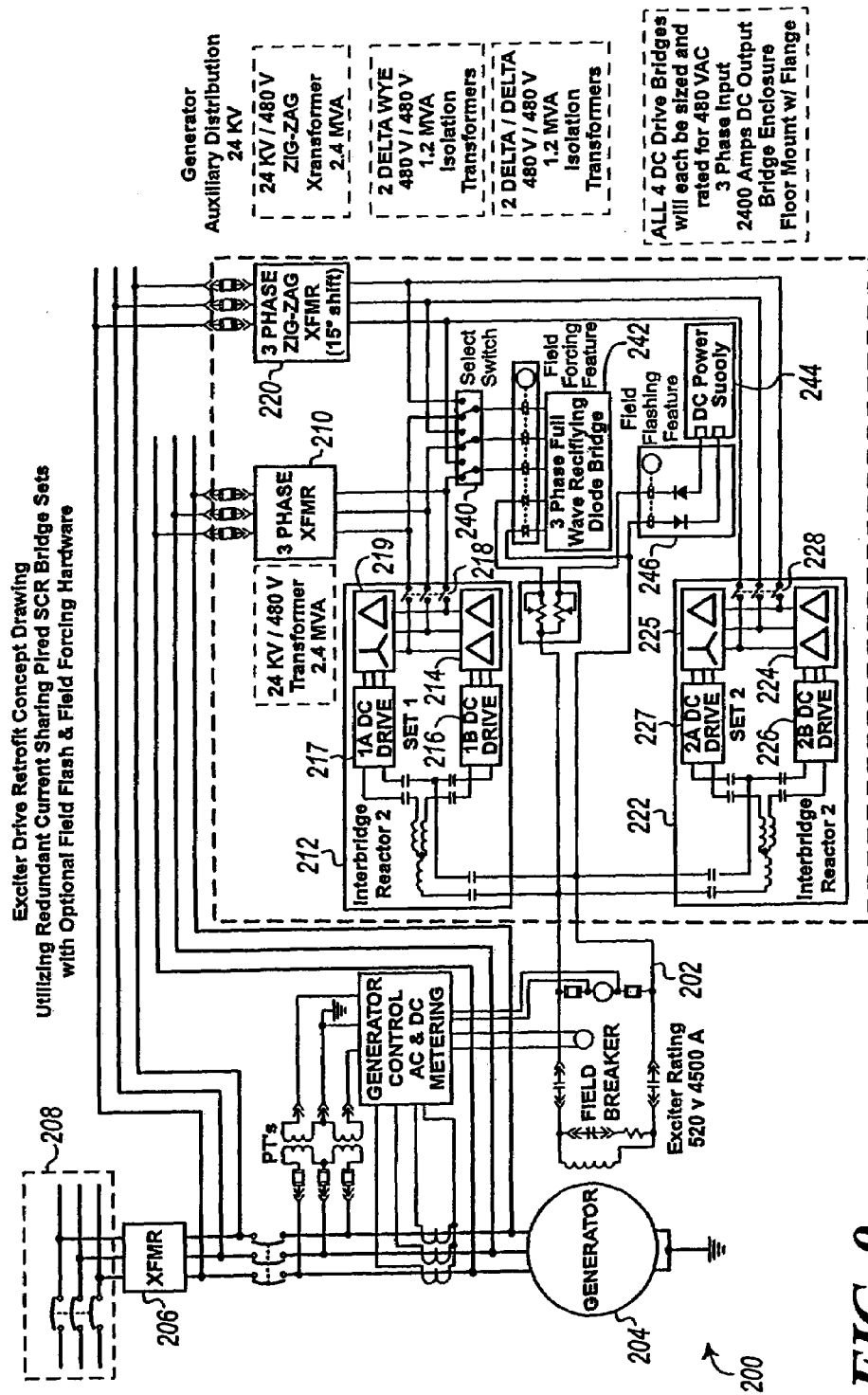
FIG. 9 is a schematic diagram of a second embodiment of a power system with a multiple redundant cooperating transformers described herein.

FIG. 9 shows a power system application 200 in which multiple transformers, grouped to pairs of transformer sets are used. A brief description of the nature of the specific application of the embodiment shown follows, but it will be appreciated that the description of a specific power system application is for illustrative purposes only and to facilitate understanding of the operation of the multiple transformer arrangement 201 shown in FIG. 9, and in no way is intended to restrict the type and number of applications and devices in conjunction with which multiple transformer arrangement 201 may be used. Rather, the embodiment of multiple transformer arrangement 201, and other embodiments of a multiple transformer arrangement as described herein, may be used to provide power to any type and any number of power applications and/or devices, and that such power applications and/or devices may include commercially available machines, devices, and/or systems, as well as custom-made power applications, machines, systems, and/or devices.

More particularly, shown in FIG. 9 is a conventional generator 204 which, as is well understood, generates voltage and current through rotational movement of an armature rotating through a magnetic field inside the generator. In the system shown in FIG. 9, the magnetic field through which the generator's armature moves is created and sustained using exciter 202. Exciter 202 is a conventional exciter, such as those manufactured by Toshiba or by Electric Machinery Company, and generates the DC current that is needed to create the magnetic field inside generator 204. As can be further seen in FIG. 9, exciter 202 is powered by the power produced by generator 204. Particularly, the AC voltage produced by generator 204, which in FIG. 9 is shown to be a 3-phase 24 KV, is directed to a first 3-phase transformer 210, and to a 3-phase zig-zag transformer 220. Transformers 210 and 220, and more particularly transformer arrangement 201, draw just enough power from generator 204 as is needed to power exciter 202. However, the bulk of the power produced by generator 204 is directed to power-consuming loads (not shown) via transformer 206 and power lines 208. In the specific example of system 200, transformer 206 transforms the generator's 204 voltage level of 24 KV to 375 KV.

As further shown in FIG. 9, first and second 3-phase transformers 210 and 220 are coupled to first and second transformer groups 212 and 222 respectively. Each of transformer groups 212 and 222 comprises a delta-delta transformer and a DC drive, connected in parallel to a wye-delta transformer and another DC drive. As will become apparent below, additional transformer groups and/or transformers may be added to the system so long that the transformer groups and/or transformers that are connected to the load(s) (in this case, exciter 202) do not compete with each other for control of the power source(s) in a way that would render the power system unstable.

In the FIG. 9 embodiment, both first and second transformer groups 212 and 222 are similar in construction and manner of operation to the transformer arrangement of system 100 in FIG. 1. With reference to first transformer group 212, as can be seen, the inputs of the first delta-delta transformer 214 and first wye-delta transformer 215 are coupled, via a switch 218, to the first 3-phase transformer 210 which transforms the 3-phase voltage power produced by generator 204 to a voltage level for transformer group 212. In this example, first 3-phase transformer 210 transforms the 3-phase 24 KV voltage level produced by generator 204 to a 3-phase 480V voltage level. Thus, since first 3-phase transformer 210 transforms the voltage level produced by generator 204, transformers 214 and 215 do not change the voltage level of the voltage they receive as input, but rather are used, in this case, to produce a voltage signal that has a frequency of 720 Hz. If transformer group 212 malfunctions, or otherwise has to be taken off-line, switch 218 can be put into its open position, thereby electrically disconnecting first transformer group 212 from generator 204. Optionally, additional switches (not shown) may be connected to the input or output of either one of first delta-delta or first wye-delta transformers 214 or 215 so that if one of the transformers 214 or 215 malfunctions, only the malfunctioning transformer would have to be disconnected from the rest of the system 200.

Coupled to the output each of first transformers 214 and 215 are first and second voltage controllers 216 and 217 respectively, which, in a manner similar to the operation of first and second voltage controllers 116 and 126 of system 100 in FIG. 1, control and rectify the voltage they receive as input from first and second transformers 214 and 215. The first and second voltage controllers 216 and 217 may be any of the various commercially available voltage controllers, including, for example, the Eurotherm 590+ driver, or alternatively, the voltage controllers may be implemented using a CPU-based device as was described in reference to first and second voltage controllers 116 and 126 of system 100 in FIG. 1. Since in the specific example illustrated in FIG. 9 the first and second voltage controllers are intended primarily to produce a DC voltage (or an approximation thereof), in FIG. 9 voltage controllers 216 and 217 have been labeled as DC Drive 1B and DC Drive 1A respectively. However, it will be clear to the person versed in the art that first and second voltage controllers 216 and 217 need not produce only DC voltage but may perform other functions and may produce other voltage signal forms as would be required by the particular application in which the transformer arrangement described herein is to be used. Optionally, other voltage and/or power control apparatus, such as power conditioners (not shown), may be coupled to either to the first and second transformers 214 and 215, and/or to first and second voltage controllers 216 and 217.

As was previously explained in relation to system 100 shown in FIG. 1, the output of a wye-delta transformer is phase shifted by 30° with respect to a 3-phase AC input voltage signal. The delta-delta transformer, on the other hand, does not result in a phase shift of the transformer's output with respect to the input voltage signal. As a result, the output of the voltage controller 217, will be phase-shifted by 30° with respect to the output of voltage controller 216. Since in the particular example of the application shown in FIG. 9 both voltage controllers 216 and 217 produce voltage signals having a positive polarity, and having a frequency of 360 Hz, combining the outputs of voltage controllers 216 and 217 will result in a positive polarity voltage signal having a frequency of 720 Hz.

In the FIG. 9 embodiment, second transformer group 222 is similar in construction and manner of operation to first transformer group 212, with the exception that second transformer group 222 is coupled to a 3-phase zig-zag transformer that phase shifts the voltage produced by generator 204 by 15°. Consequently, the voltage produced by the output of the delta-delta transformer 224 will be phase shifted by 15° with respect to the voltage signal of generator 204, and the output of the wye-delta transformer 225 will be phase shifted by 450 with respect to the voltage signal of generator 204 (the 15 shift caused by second 3-phase transformer 220, plus the 30° shift caused by a wye-delta transformer). By extension, the combined output of third and fourth voltage controllers 226 and 227 will be a positive polarity voltage signal having a frequency of 720 Hz, which is phase-shifted by 15° with respect to the output of first transformer group 212. Thus, combining the two non-congruent or out-of phase 720 Hz voltage signals produced by first and second transformer groups 212 and 222 respectively will result in a voltage signals that has twice the number of ripples, or cycles, as any one of the signals produced by first and second transformer groups 212 and 222 individually, thereby resulting in a single voltage signal having a frequency of 1440 Hz.

FIG. 9 further shows that first 3-phase transformer 210 and zig-zag second 3-phase transformer 220 are coupled to select switch 240, the output of which is, in turn, coupled to 3-phase full wave rectifying diode bridge 242. Additionally, also coupled to the input of exciter 202 is a DC power source 244 connected to field flashing circuitry 246. As will be appreciated, since the exciter 202 is ordinarily powered by generator 204, when generator 204 is idle and has to be started, exciter 202 may initially be powered by DC power source 244. Once the exciter begins operating, thereby creating a magnetic field inside generator 204 which in turn enables generator 204 to produce power that can be partly used to power exciter 202, the DC power source 244 field flashing circuit 246 may be disconnected from exciter 202.

In operation, first and second transformer groups 212 and 222 each receive a voltage signal from first and second 3-phase transformers 210 and 220 respectively, and produce a half rectified or fully rectified voltage signals. Due to the phase shift caused by zig-zag transformer 220, the output voltage signal of second transformer group 222 will be phase-shifted by 15°, and consequently, since the two output voltage signals produced by first and second transformer groups 212 and 222 will not be congruent, the first and second transformers groups 212 and 222 will not compete with each other for control of system 200. Rather, first and second transformer groups 212 and 222 will cooperate with each other in the sense that the two output voltage signals produced by first and second transformer groups 212 and 222 and presented at the input to exciter 202 will result in a single voltage signal having a frequency that is twice the frequency of each of the individual voltage signals produced by first and second transformer groups 212 and 222. Subsequently, if one of first and second transformer groups 212 and 222 malfunctions and/or is taken off line, the remaining transformer group will continue to supply exciter 202 with a voltage signal having half the frequency of the that the combined voltage signal, cooperatively generated by first and second transformer groups 212 and 222. It will be appreciated that by using a total of four transformers, if one transformer group is taken off line, one transformer group, having two transformers, will be able to deliver the power needed to operate the load device(s). By contrast, when using a two transformer arrangement, as was done in system 100 of FIG. 1, a malfunction of a single transformer would leave only one transformer to handle the power requirements of the load device(s) connected to the system. Furthermore, having two out of four functioning transformers in system 200 may result in a signal that is a good approximation of a DC signal.

As will be further appreciated, transformer arrangement 201 may be implemented using additional transformer groups comprising, for example, a delta-delta transformer placed in parallel to a wye-delta transformer. Such additional transformer groups could be coupled to additional phase-shifting transformers that would cause the phase of the resultant voltage signals produced by such additional transformer groups to be non-congruent with the voltage signals produced by other transformer groups. Consequently, by having multiple transformer groups produce voltage signals that are out of phase with respect to each other, the resultant signal presented to the power consuming loads would have a frequency relating or approximating the sum of the frequencies of the voltage signals produced by the individual transformer groups. Furthermore, the addition of transformer groups, or even individual transformers, will provide the system with increased redundancy to improve robustness. Also, by adding more transformer groups, or individual transformers, and coupling such transformers to voltage controllers that may perform rectifying and control functions, the resultant voltage signal presented to the power-consuming loads, and having a frequency related to the sum of the individual frequencies of the voltage signals produced by the individual transformers and transformer groups, may more closely approximate a DC voltage signal, and may allow a more efficient operation of power consuming devices, such as exciters, which generally require a DC voltage for optimal operation.

It will also be appreciated that an overall control module (not shown) may be added to system 100 and/or system 200 to control the various performance features and desired configurations of system 200. Such a control module could be implemented as a CPU-based device capable of receiving, storing and executing computer instructions, and having peripheral modules for otherwise receiving and sending data and information. Accordingly, the methods and systems described herein can include a microprocessor having instructions for selecting, enabling, connecting, and/or switching the various transformers and/or transformer groups, and/or to allow the generator to be driven based on an output from the various transformers and/or transformer groups. In one configuration, the instructions can allow a load-sharing configuration to allow for stable operation through, for example, otherwise unstable conditions such as, for example, a power transient. In some embodiments, the instructions can allow the generator to be driven based on outputs from the first and second transformers operating in a parallel configuration, such that outputs from the first and second transformers can be combined to drive the generator.

The methods and systems described herein are not limited to a particular hardware or software configuration, and may find applicability in many computing or processing environments. The methods and systems can be implemented in hardware, or a combination of hardware and software, and/or can be implemented from commercially available modules applications and devices. Where the implementation of the systems and methods described herein is at least partly based on use of microprocessors, the methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

Although the methods and systems have been described relative to specific embodiments thereof, they are not so limited. Obviously many modifications and variations may become apparent in light of the above teachings.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A system, comprising:
   a power source having a first voltage signal having a first frequency;
   at least one power-consuming load;
   a first transformer set comprising a delta-delta transformer, and a first voltage controller electrically coupled in series to said delta-delta transformer, said first transformer set having an input and an output, wherein said input of said first transformer set is electrically coupled to said power source to receive said first voltage signal and produce a second voltage signal having a second frequency, and wherein said output of said first transformer set is coupled to said at least one power-consuming load; and
   a second transformer set comprising a wye-delta transformer, and a second voltage controller electrically coupled in series to said wye-delta transformer, said second transformer set having an input and an output, wherein said input of said second transformer set is electrically coupled to said power source to receive said first voltage signal, and wherein said output of said second transformer set is coupled to said at least one power-consuming load, and wherein said wye-delta transformer causes a phase shift to said first frequency of said first voltage signal such that said second transformer set produces a third voltage signal having a third frequency, said third frequency being out of phase with respect to said second frequency;

wherein said second transformer set and said first transformer set are coupled in an electrical parallel configuration such that said second voltage signal and said third voltage signal combine to produce a fourth voltage signal having a fourth frequency at said at least one power-consuming load.

2. The power supply system of claim 1, wherein said first transformer set further comprises a first switch for electrically disconnecting said power source from said at least one power consuming load through said first transformer set, and wherein said second transformer set further comprises a second switch for electrically disconnecting said power source from said at least one power consuming load through said second transformer set.

3. The power supply system of claim 1, wherein said first voltage controller of said first transformer set causes said second voltage signal to be half-wave rectified, and wherein said second voltage controller of said second transformer set causes said third voltage signal to be half-wave rectified.

4. A system, comprising:

a power source having a first voltage signal having a first frequency;

at least one power-consuming load device;

a first transformer group comprising a first delta-delta transformer electrically coupled in series to a first voltage controller, and a first wye-delta transformer electrically coupled in series to a second voltage controller, said first delta-delta transformer and said first voltage controller connected in an electrical parallel configuration to said first wye-delta transformer and said second voltage controller, said first transformer group having an input and an output, wherein said input of said first transformer group is electrically coupled to said power source and said output of said first transformer group is electrically coupled to said at least one power-consuming load, said first transformer group receives said first voltage signal and produces a second voltage signal having a second frequency; and a second transformer group comprising a second delta-delta transformer electrically coupled in series to a third voltage controller, and a second wye-delta transformer electrically coupled in series to a fourth voltage controller, said second delta-delta transformer and said third voltage controller connected in an electrical parallel configuration to said second wye-delta transformer and said fourth voltage controller, wherein said second transformer group has an input and output, said input of said second transformer group is coupled to said power source and said output of said second transformer group is electrically coupled to said at least one power-consuming load, and wherein said second transformer group produces a third voltage signal having a third frequency based on said first voltage signal, and wherein said second transformer group is further electrically coupled in series to a phase-shifter that causes said third frequency to be phase-shifted with respect to said second frequency;

wherein said first transformer group is connected in an electrical parallel configuration to said second transformer group and said phase-shifter such that said second voltage signal and said third voltage signal combine to produce a fourth voltage signal having a fourth frequency.

5. The power supply system of claim 4, wherein said first transformer group further comprises a first switch for electrically disconnecting said power source from said at least one power consuming load through said first transformer group, and wherein said second transformer group further comprises a second switch for electrically disconnecting said power source from said at least one power consuming load through said second transformer group.

6. The power supply system of claim 4, wherein said first voltage controller and said second voltage controller of said first transformer group cause said second voltage signal to be half-wave rectified, and wherein said third voltage controller and said fourth voltage controller of said second transformer group cause said third voltage signal to be half-wave rectified.

* * * * *